(12) United States Patent
Klees et al.

(10) Patent No.: US 7,856,887 B2
(45) Date of Patent: Dec. 28, 2010

(54) PRESSURE MANAGEMENT ARRANGEMENT

(75) Inventors: Daniel Klees, Greenwood, IN (US); Mark Repko, Indianapolis, IN (US); Simon Zuehlke, Steinen (DE); Hubert Schmidlin, Village-Neuf (FR)

(73) Assignee: Endress + Hauser GmbH + Co. KG, Maulburg (DE)

( * ) Notice: Subject to any disclaimer, the term of this patent is extended or adjusted under 35 U.S.C. 154(b) by 113 days.

(21) Appl. No.: 12/379,713

(22) Filed: Feb. 27, 2009

(65) Prior Publication Data
US 2009/0241677 A1 Oct. 1, 2009

Related U.S. Application Data

(60) Provisional application No. 61/064,794, filed on Mar. 27, 2008.

(51) Int. Cl.
*G01L 7/08* (2006.01)
(52) U.S. Cl. .......................................... 73/756; 600/488
(58) Field of Classification Search ........................ None
See application file for complete search history.

(56) References Cited

U.S. PATENT DOCUMENTS

| | | | | |
|---|---|---|---|---|
| 5,551,300 A | * | 9/1996 | Vurek et al. ................... 73/706 |
| 5,993,395 A | * | 11/1999 | Shulze ......................... 600/488 |
| 6,117,086 A | * | 9/2000 | Shulze ......................... 600/488 |
| 6,635,020 B2 | * | 10/2003 | Tripp et al. ................... 600/488 |
| 7,254,434 B2 | * | 8/2007 | Schulz et al. ................. 600/344 |
| 2002/0151837 A1 | * | 10/2002 | Shipp ........................... 604/35 |
| 2002/0198458 A1 | * | 12/2002 | Tripp et al. ................... 600/485 |
| 2007/0293786 A1 | * | 12/2007 | Wekell et al. ................. 600/561 |

\* cited by examiner

*Primary Examiner*—Andre J Allen
(74) *Attorney, Agent, or Firm*—Bacon & Thomas, PLLC

(57) ABSTRACT

A pressure measurement arrangement for measuring a line pressure of a product is described wherein product hold-up inside of disposable parts is minimized, comprising: a reusable pressure sensor comprising a measurement diaphragm, a fitting, the fitting comprising: a tubular opening extending through said fitting, for the reception of a disposable elastomeric tube, an aperture extending through an outside wall of the fitting into the tubular opening; and mounting structure, for mounting the pressure sensor on the aperture, such that the measurement diaphragm is exposed to an inside of the tubular opening; wherein the disposable tube is inserted in the tubular opening of the fitting during measurement; and an outside wall of the disposable tube comprises a thin flexible portion, which conforms to the measurement diaphragm when the disposable tube is pressurized by the line pressure.

8 Claims, 3 Drawing Sheets

PRESSURE MANAGEMENT ARRANGEMENT

This application is a Nonprovisional Application which claims the benefit of U.S. Provisional Application Ser. No. 61/064,794 which was filed on Mar. 27, 2008.

TECHNICAL FIELD

The present invention concerns a pressure measurement arrangement for measuring a line pressure of a product using a reusable pressure sensor comprising a measurement diaphragm.

BACKGROUND DISCUSSION

Such arrangements are widely used in various branches of industry as well as in medical, pharmaceutical and biotechnological applications.

In many branches of industry, for example in the Pharmaceutical Industry, Biotechnology Industry, and in the Medical Industry, very high standards of hygiene are required. These standards may vary slightly from country to country, but in general, they require that any surfaces of the measurement arrangement which may come in contact with the product can be effectively cleaned and/or sterilized.

Cleaning and/or sterilization of equipment requires time, during which the equipment and the connected piping system cannot be otherwise used. This time is lost for production every time cleaning or sterilization is required, for example due to a change of product or batch. This is very costly, especially when batch times or product cycles are short compared to the time required for cleaning and/or sterilization.

In order to overcome this problem, the use of disposable parts has become more and more widely used in the Pharmaceutical and the Biotechnology Industries as well as in the Medical Industry.

U.S. Pat. No. 7,096,729 B2 for example describes a disposable fluid flow sensor comprising a fluid flow sensor die, which is mounted on a disposable flow channel tube. A flow sensor die comprising a heater and corresponding sensing elements is for example described in U.S. Pat. No. 6,871,537 B1.

U.S. Pat. No. 6,725,726 for example, describes a pressure measurement arrangement for measuring a line pressure of a product using a reusable pressure sensor comprising a measurement diaphragm. In this arrangement the reusable sensor is connected to a disposable element comprising a measurement chamber. This chamber is connected to the pressure line via an inlet and an outlet channel. It comprises a flexible diaphragm which is in close contact with the measurement diaphragm of the reusable pressure sensor, when the sensor is mounted on the disposable element. This type of connecting element is known in medical technology under the term "dome" or "pressure dome". The line pressure to be measured is transmitted onto the measurement diaphragm of the sensor via the diaphragm of the measurement chamber. The entire element including the measurement chamber is disposed of after use. It is commonly believed, that pressure domes are necessary, in order to provide a contact surface which is large enough to transmit the line pressure onto the measurement diaphragm of the pressure sensor.

Because of the dome shaped form of the measurement chamber, product will get trapped inside the disposable element. Unfortunately, this means that any product that is held up inside the pressure dome or measurement chamber can not be recovered after the measurement. It will be disposed together with the disposable element.

There are many application where line pressure of expensive products needs to be measured. Any product, that cannot be recovered increases the cost. For example, in the purification process of a Biotech Product, the few cubic centimeters of residual product remaining in a pressure dome or measurement chamber, often called "product hold-up", may be worth in excess of several hundred thousand dollars.

SUMMARY OF THE INVENTION

It is an object of the invention to provide a measurement arrangement, wherein product hold-up inside of disposable parts is minimized.

To this end the invention comprises a pressure measurement arrangement for measuring a line pressure of a product, comprising:
  a reusable pressure sensor comprising a measurement diaphragm,
  a fitting, comprising:
  a tubular opening extending through the fitting, for the reception of a disposable elastomeric tube,
  an aperture extending through an outside wall of the fitting into the tubular opening; and
  mounting means, for mounting the pressure sensor on the aperture, such that the measurement diaphragm is exposed to an inside of the tubular opening; wherein
  the disposable tube is inserted in the tubular opening of the fitting during measurement; and
  an outside wall of the disposable tube comprises a thin flexible portion, which forms to the measurement diaphragm when the disposable tube is pressurized by the line pressure.

According to a refinement of the invention, the disposable tube comprises two outer sections and a middle section, located between the two outer sections; wherein the middle section has a wall thickness which is thinner than a wall thickness of the outside sections. The thin flexible portion of the disposable tube, which forms to the measurement diaphragm when the disposable tube is pressurized, is part of the middle section, and the disposable tube is mounted inside the tubular opening, such that the measurement diaphragm and an inner surface of the tubular opening form a mechanical support for the middle section.

According to a further refinement, the fitting comprises a vent, allowing air or gas trapped between the tube and the measurement diaphragm to escape.

According to a further refinement, the fitting comprises a vent, the vent extending from an interior of the fitting through an outside wall of the fitting, wherein the interior connects an inside of the aperture with an inside of the tubular opening.

The invention further comprises a refinement, wherein the fitting consists of two elements, each element comprises an aperture, and said elements are mounted on top of each other during measurement operation, such that the apertures form the tubular opening of the fitting.

According to a further refinement, one of the elements comprises the aperture extending through an outside wall of the fitting into the tubular opening and mounting means, for mounting the pressure sensor on the aperture.

According to a further refinement, the fitting consists of two elements, which are connected via at least one hinge connecting the two elements on a first outside wall side of the fitting, and a latch for releasably connecting the two elements on a second outside wall of the fitting, opposite the first outside wall.

The invention further comprises a fitting for connecting a reusable pressure sensor comprising a pressure measurement diaphragm to a pressure line for measuring a line pressure the fitting comprising:

a tubular opening extending through the fitting, for the reception of a disposable elastomeric tube, an aperture extending through an outside wall of the fitting into the tubular opening; and mounting means, for mounting the pressure sensor on the aperture, such that the measurement diaphragm is exposed to an inside of the tubular opening; wherein the disposable tube is inserted in the tubular opening of the fitting during measurement; and an outside wall of the disposable tube comprises a thin flexible portion, which forms to the measurement diaphragm when the disposable tube is pressurized by the line pressure.

The invention and further advantages are explained in more detail using the figures of the drawing, in which one exemplary embodiment is shown. The same reference numerals refer to the same elements throughout the figures.

DETAILED DESCRIPTION OF THE DRAWINGS

Figure 1:
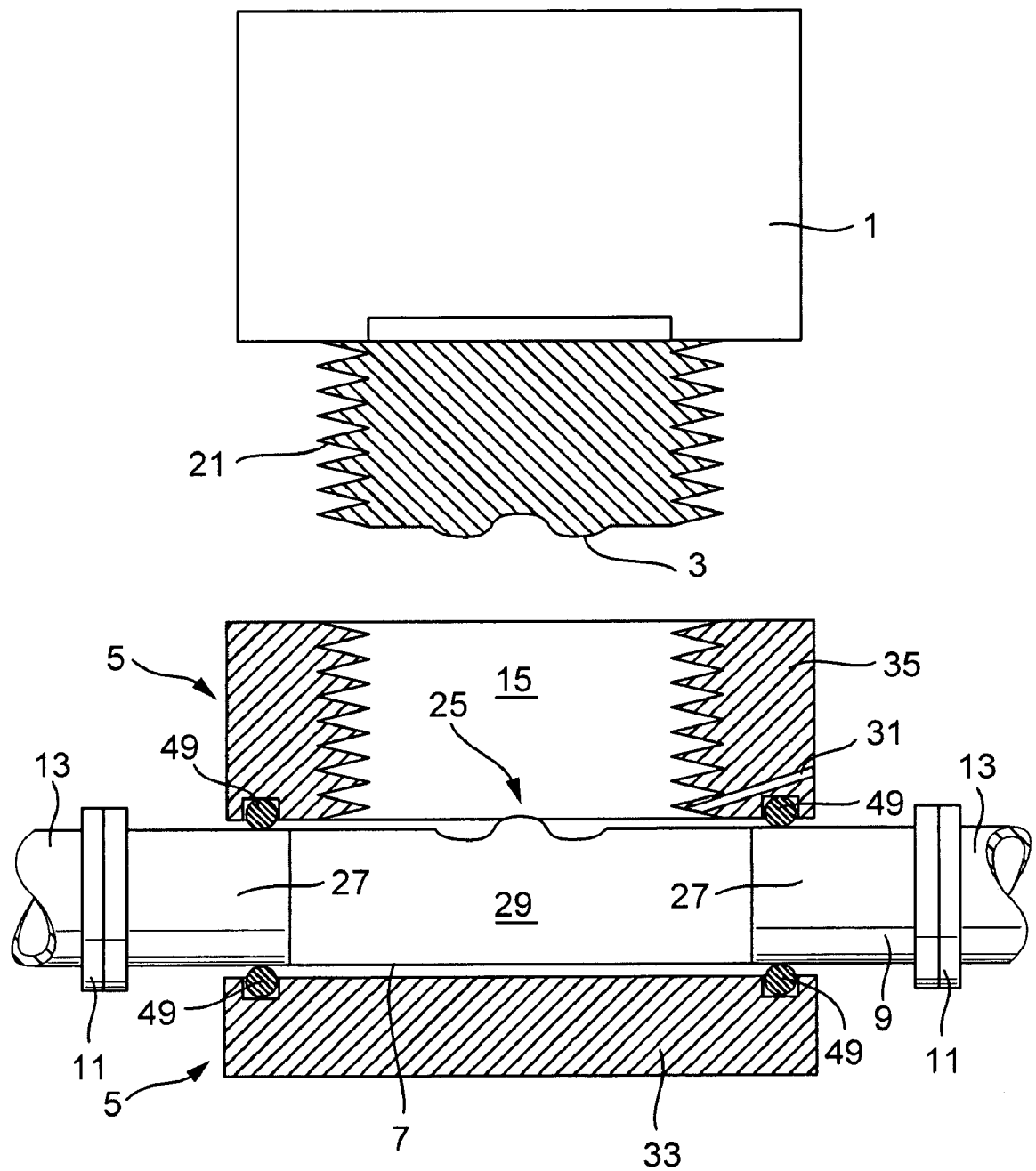
FIG. 1 shows a cross sectional view of a pressure measurement arrangement for measuring a line pressure of a product.

FIG. 1 shows a cross sectional view of a pressure measurement arrangement for measuring a line pressure of a product according to the invention. The arrangement comprises a reusable pressure sensor 1 comprising a measurement diaphragm 3. Such pressure sensors are sold on the market, e.g. the pressure sensor 'Cerabar T' sold by the applicant can be used. When a pressure to be measured is exerted on the measurement diaphragm 3, this causes a deflection of the diaphragm, which is measured by the pressure sensor 1 and transformed into a measurement signal representing the pressure to be measured.

The arrangement comprises a fitting 5, which comprises a tubular opening 7 for the reception of a disposable elastomeric tube 9. The opening 7 extends through the fitting 5. A process connector 11 is foreseen on both ends of the tube 9, for connecting the tube 9 to a pressure line 13.

The fitting 5 further comprises an aperture 15 extending through an outside wall of the fitting 5 into the tubular opening 7.

Figure 2:
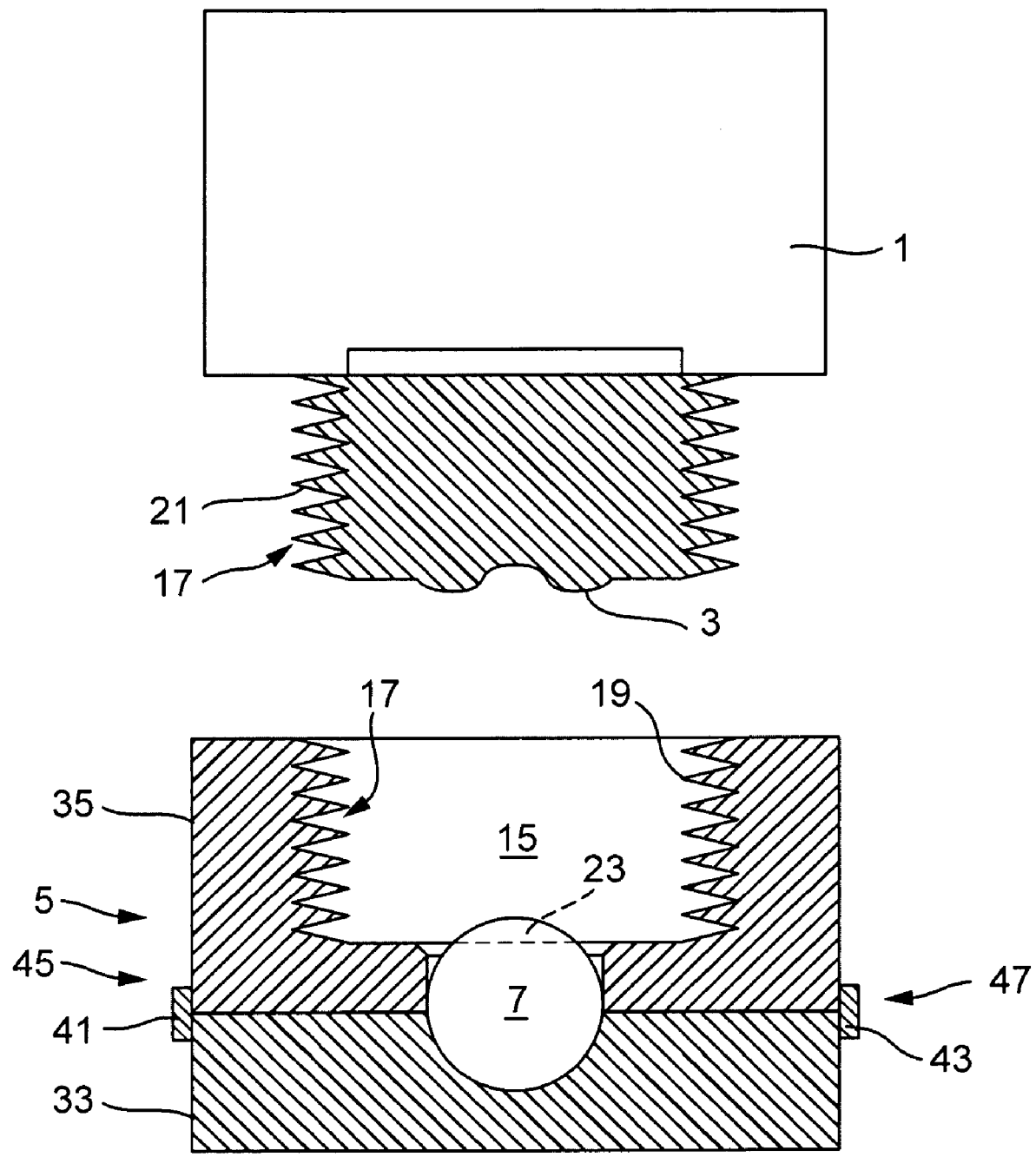
FIG. 2 shows a cross sectional view of the arrangement in a plane, perpendicular to a longitudinal axis of the tube.

Mounting means 17 are foreseen for mounting said pressure sensor 1 on the aperture 15, such that the measurement diaphragm 3 is exposed to an inside of said tubular opening 7. In the embodiment shown, the mounting means 17 comprise an inner thread 19 located on an inside wall of the aperture 15 and an outer thread 21 on a corresponding outside wall of a cylindrical front portion the pressure sensor 1 facing into the fitting 5. The invention is not limited to this type of mounting means. Other means for mounting known in the art can also be used. The measurement diaphragm 3 of the pressure sensor 1 is located on a front end of this cylindrical portion, which extends into the tubular opening 7 of the fitting 5, when mounted. The measurement diaphragm 3 is located flush to the front end of the cylindrical portion. This can be best seen in FIG. 2. FIG. 2 shows a cross sectional view of the arrangement in a plane, perpendicular to a longitudinal axis of the tube 9.

When the pressure sensor 1 is fully screwed into the aperture 15, the measurement diaphragm 3 enters the tubular opening 7 and closes off a top section 23 of the tubular opening 7 as indicated by the dashed line in FIG. 2.

During measurement, the disposable tube 9 is inserted in the tubular opening 9, the pressure sensor 1 is mounted on the fitting 15, and the pressure line 13 is connected to the tube 9. The tube 9 is for example made of Silicone, Fluorosilicone, Polyvinylchloride (PVC) or a Fluoroelastomer. Fluoroelastomers are for example sold by DuPont under the trade name Viton. The tube 9 can have an outer diameter of for example up to 50 mm.

According to the invention, an outside wall of the disposable tube 9 comprises a thin flexible portion 25, which forms to the measurement diaphragm 3 of the pressure sensor 1 when the disposable tube 9 is pressurized by the line pressure. The line pressure is exerted on the thin flexible portion 25 by the product, that runs through the tube 9 during measurement. In the embodiment shown, the measurement diaphragm 3 is convoluted and the thin flexible portion 25 forms to the measurement diaphragm 3, such that is closely covers the convoluted measurement diaphragm 3. The thin flexible portion 25 is dimensioned such, that it covers at least a central pressure sensitive main portion of the of the pressure measurement diaphragm 3.

Figure 3:
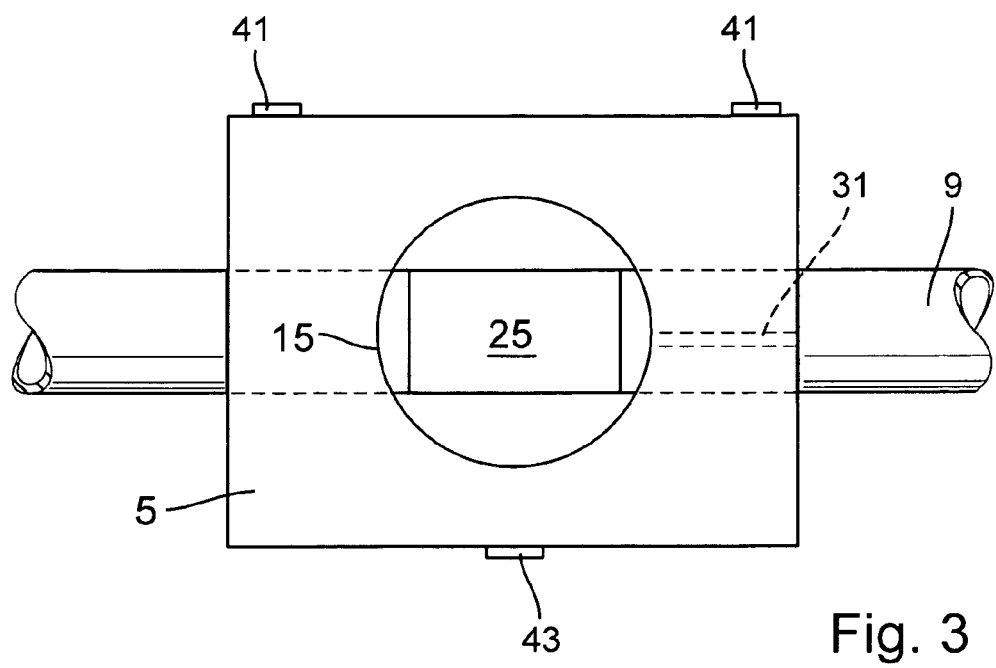
FIG. 3 shows a view of the fitting and the tube inside the fitting seen from above the aperture.

FIG. 3 shows a view of the fitting 5 and the tube 9 inside the fitting 5 seen from above the aperture 15. The thin flexible portion 25 faces up into the aperture 15. In the view shown in FIG. 3 the aperture 15 has a circular cross-section and the flexible portion 25 has a quadratic cross-section, which covers an area, which is almost as big as the area of the circular cross-section of the aperture 15. When the pressure sensor 1 is mounted on the aperture 15, the measurement diaphragm 3 covers at least most of the area defined by the quadratic cross-section. In order to obtain a large contact surface for the pressure transmission onto the measurement diaphragm 3, the diameter of the pressure measurement diaphragm 3 is equal to or smaller than the diameter of the tube 9.

The thin flexible portion 25 ensures a nearly unimpaired transmission of the line pressure to the measurement diaphragm 3 of the pressure sensor 1. To this extend, it is favorable to design the wall thickness of this portion 25 as thin as possible. Since the thin portion 25 forms to the measurement diaphragm 3, when pressurized, the measurement diaphragm 3 forms a mechanical support for the thin portion 25. The thin portion 25 does not have to be rigid enough, to withstand the entire line pressure on its own. It is sufficient, if it is rigid enough to withstand the line pressure, when supported by the measurement diaphragm 3.

Obviously, it is sufficient, if only those sections of the tube 9, which need to come in close alignment with the measurement diaphragm 3 during measurement are thin and flexible.

In order to facilitate manufacturing of the tube 9, the tube 9 preferably comprises three individual sections: namely two outer sections 27 and a middle section 29, located between the two outer sections 27. Each section has a constant wall thickness throughout the entire length of the section, and the wall section of the middle section 29 is thinner, than the wall thickness of the two outer sections 27. In this embodiment, the thin flexible portion 25, which forms to the measurement diaphragm 3 when the disposable tube 9 is pressurized, is part of the middle section 29.

Again, the middle section 29 does not have to be rigid enough, to withstand the entire line pressure. When the tube 9 is mounted inside the tubular opening 7, the measurement diaphragm 3 and an inner surface of the tubular opening 7 form a mechanical support for the entire middle section 27.

To this extend, the tube 9, in particular the outer sections 27 can for example have a wall thickness ranging from 0.8 mm to 1.4 mm and the middle section 29 or the thin flexible portion 25 respectively can have a wall thickness ranging for example from 0.05 mm to 0.25 mm.

Preferably, the fitting 15 comprises a vent 31, allowing air or gas trapped between said tube 9 and said measurement diaphragm 3 to escape. This ensures, that any air or gas, which might be enclosed between the thin flexible portion 25 and the measurement diaphragm 3 during or after the mounting of the pressure sensor 1 on the fitting 5 is pushed out when the tube 9 is pressurized.

The vent 31 extends from an interior of the fitting 5 connecting an inside of the aperture 15 with an inside of said tubular opening 9 through an outside wall of said fitting 5. In addition to the vent 31 shown, additional vents of the same or similar design can be foreseen in the fitting 15.

It may be possible for the fitting and the disposable tube to be manufactured as one integral part. In that case, the fitting and tube have to be disposed of after use.

Preferably, the fitting 5 and the tube 9 are separate parts. This allows for the fitting 5 to be reusable. To this extend, the fitting 5 consists of two elements 33, 35. FIG. 3 shows the two elements 33, 35. Each element 33, 35 comprises an aperture 37, 39 for the reception of a part of the tube 9. The elements 33, 35 are mounted on top of each other during measurement operation, such that the apertures 37, 39 form the tubular opening 7 of the fitting 5.

One of the elements, here the element 35, comprises the aperture 15 extending through the outside wall of the fitting 5 into the tubular opening 7 and the mounting means 17, for mounting the pressure sensor 1 on the aperture 15.

The two elements 33, 35 are connected to each other in such a way, that the fitting 5 can be opened up for the insertion of the tube 9 and firmly closed after the insertion during the entire measurement.

Figure 4:
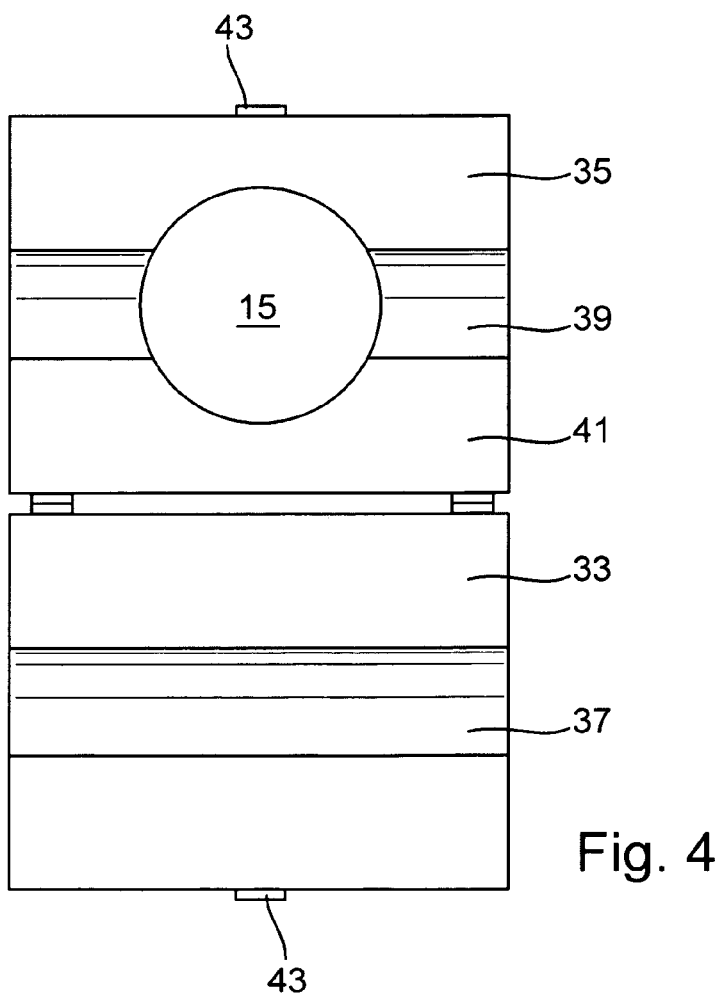
FIG. 4 shows a fitting consisting of two elements.

To this extend, the elements 33, 35 of the fitting 5 shown in FIG. 4 are connected via at least one hinge 41 connecting the two elements 33, 35 on a first outside wall 45 of fitting 5, and a latch 43 for releasably connecting the two elements 33, 35 on a second outside wall 47 of the fitting 5, opposite the first outside wall.

The tube 9 is clamped between the two elements 33, 35 and thus held in place. In addition, means 49 can be foreseen to further secure the tube 9 in place. Such means 49 are indicated in FIG. 1. They can for example consist of annular protrusions which are molded onto the outer sections 27 of the tube 9, which slot into corresponding grooves foreseen inside the fitting 5 when the tube 9 is inserted.

The line pressures, which can be measured with the measurement arrangement according to the invention typically range from 0 PSI to 5 PSI (approximately 0 kPa to 35 kPA). Pressures up to a maximum of 15 PSI (approximately 100 kPa) can be measured.

It is an advantage of the invention, that only the tube 9 needs to be disposed of after use. Limiting the number of disposable parts to just this one reduces the costs.

In addition, the tube 9 does not increase the flow resistance. It is cylindrical and can have exactly the same inner diameter as the pressure line. Thus no additional pressure losses occur due to the measurement arrangement. The measurement arrangement does not comprise any inner chambers or recesses. The product is only send through the tube 9, which because of its hollow cylindrical shape drains very well after use. All product sent through the arrangement, except for clingage, will be recovered after the measurement. Thus product hold-up in disposable parts is minimized.

What is claimed is:

1. A pressure measurement arrangement for measuring a line pressure of a product, comprising:
   a reusable pressure sensor comprising a measurement diaphragm; and a fitting, said fitting comprising: a tubular opening extending through said fitting, for the reception of a disposable elastomeric tube, an aperture extending through an outside wall of said fitting into said tubular opening; and mounting means, for mounting said reusable pressure sensor on said
   aperture, such that said measurement diaphragm is exposed to an inside of said tubular opening; wherein:
   said disposable elastomeric tube is inserted in said tubular opening of said fitting during measurement; and
   an outside wall of said disposable tube comprises a thin flexible portion, which conforms to said measurement diaphragm when said disposable elastomeric tube is pressurized by the line pressure.

2. The pressure measurement arrangement according to claim 1, wherein:
   said disposable elastomeric tube comprises two outer sections and a middle section, located between said two outer sections;
   said middle section has a wall thickness, which is thinner than a wall thickness of said outer sections;
   said thin flexible portion of said disposable elastomeric tube, which conforms to said measurement diaphragm when said disposable elastomeric tube is pressurized, is part of said middle section; and
   said disposable elastomeric tube is mounted inside said tubular opening, such that said measurement diaphragm and an inner surface of said tubular opening form a mechanical support for said middle section.

3. The pressure measurement arrangement according to claim 1, wherein:
   said fitting comprises a vent, allowing air or gas trapped between tubular opening and said measurement diaphragm to escape.

4. The pressure measurement arrangement according to claim 1, wherein:
   said fitting comprises a vent, said vent extending from an interior of said fitting through an outside wall of said fitting; and
   said interior of said fitting connects an inside of said aperture with an inside of said tubular opening.

5. The pressure measurement arrangement according to claim 1, wherein:
   said fitting consists of two elements, each element comprises an aperture; and
   said elements are mounted on top of each other during measurement operation, such that said apertures form said tubular opening of said fitting.

6. The pressure measurement arrangement according to claim 5, wherein:
   one of said elements comprises said aperture extending through an outside wall of said fitting into said tubular opening and mounting means, for mounting said pressure sensor on said aperture.

7. The pressure measurement arrangement according to claim 1, wherein:
said fitting consists of two elements, which are connected via at least one hinge connecting said two elements on a first outside wall side of said fitting, and a latch for releasably connecting said two elements on a second outside wall of said fitting, opposite said first outside wall.

8. A fitting for connecting a reusable pressure sensor comprising a pressure measurement diaphragm to a pressure line for measuring a line pressure, said fitting comprising:
a tubular opening extending through said fitting, for the reception of a disposable elastomeric tube;
an aperture extending through an outside wall of said fitting into said tubular opening; and
mounting means, for mounting said pressure sensor on said aperture, such that said measurement diaphragm is exposed to an inside of said tubular opening, wherein:
said disposable tube is inserted in said tubular opening of said fitting during measurement; and
an outside wall of said disposable tube comprises a thin flexible portion, which conforms to said measurement diaphragm when said disposable elastomeric tube is pressurized by the line pressure.

* * * * *